(12) United States Patent  (10) Patent No.: US 7,971,146 B2
Gruen  (45) Date of Patent: Jun. 28, 2011

(54) METHOD FOR VISUAL DEPICTION OF AUDIENCES FOR VIEWING ITEMS IN BLOGS AND OTHER ELECTRONIC REPOSITORIES

(75) Inventor: Daniel M. Gruen, Newton, MA (US)

(73) Assignee: International Business Machines Corporation, Armonk, NY (US)

( * ) Notice: Subject to any disclaimer, the term of this patent is extended or adjusted under 35 U.S.C. 154(b) by 799 days.

(21) Appl. No.: 11/955,552

(22) Filed: Dec. 13, 2007

(65) Prior Publication Data

US 2009/0158159 A1  Jun. 18, 2009

(51) Int. Cl.
 *G06F 3/48* (2006.01)
 *G06F 3/14* (2006.01)
 *G06F 15/00* (2006.01)
 *G06F 17/00* (2006.01)

(52) U.S. Cl. ......... 715/751; 705/26.1; 705/344; 705/14; 725/145; 725/146; 707/758; 715/730; 715/750

(58) Field of Classification Search .......... 715/200–277, 715/700–867; 700/701–866; 709/201–229; 705/50–79, 14; 345/30–111; 707/758; 725/146
 See application file for complete search history.

(56) References Cited

U.S. PATENT DOCUMENTS

| 7,707,218 B2 * | 4/2010 | Gocht et al. ............... 707/758 |
| 2004/0237033 A1 | 11/2004 | Woolf et al. |
| 2005/0198021 A1 | 9/2005 | Wilcox et al. |
| 2006/0200483 A1 | 9/2006 | Gorzela et al. |
| 2007/0250901 A1 * | 10/2007 | McIntire et al. ............ 725/146 |
| 2008/0307320 A1 * | 12/2008 | Payne et al. ............... 715/751 |
| 2008/0319856 A1 * | 12/2008 | Zito et al. ................. 705/14 |
| 2009/0271283 A1 * | 10/2009 | Fosnacht et al. ............ 705/26 |

OTHER PUBLICATIONS

James Pagnotta :: Weblog :: Access Restrictions—Private Images in a Public Entry, ELGG.NET, Oct. 17, 2006.

* cited by examiner

*Primary Examiner* — Ruay L Ho
(74) *Attorney, Agent, or Firm* — Cantor Colburn LLP; Steven Kurlowecz

(57) ABSTRACT

Audiences for viewing items in one or more electronic repositories including a blog are visually depicted. Input from a user is received for creating different types of items for viewing in the blog. The different types of items include private items, items that are internal for an organization, and public items. Input is also received from the user for selecting audiences for viewing the different types of items in the blog. Items for viewing on the blog are selected from among the created items, and the selected items are displayed on the blog for viewing by the selected audiences. Each selected item is displayed with a visual cue that is distinct for each type of item. The visual cue indicates the selected audience for viewing the item.

4 Claims, 2 Drawing Sheets

SHOW [ ] PUBLIC [ ] INTERNAL [ ] PRIVATE

PUBLIC INTERNET BLOG ENTRY

I RECENTLY ENCOUNTERED AN INTERESTING EXAMPLE OF "AMATEUR INTEGRATION" - THIS TIME DONE BY KIDS! IF YOU'RE INTERESTED IN GAMING, EDUCATION, AND SAMPLE TOOLS FOR CONSTRUCTION BE SURE TO CHECK OUT THE INTERESTING WIDGET BUILDING SET AT KIDMAKERTOYS.COM. I WAS PARTICULARLY EXCITED BY THE SAMPLE APP A 7 YEAR KID CREATED THAT LETS HIM HOOK HIS SISTER'S IPOD TO HIS HALO SCORES.
COMMENTS (0)

w3.ibm.com/blog
IBM  A THOUGHT OCCURRED TO ME AFTER THE LAST INTERNAL JAM. HAS ANYONE EVER ATTEMPTED TO PLACE A VALUE ON VALUES, COMPARING A COMPANY'S GUIDELINES AND VALUE STATEMENTS TO THEIR PROFITABILITY?
COMMENTS (3)

DAN'S PRIVATE NOTES

LOOK INTO THE WORK ON BIOMED ONTOLOGIES, PARTICULARLY ibio.com. (STEVE MENTIONED). SOME INITIAL THOUGHTS:
- TOO HARD TO UNDERSTAND DOMAIN?
- DIFFERENT BECAUSE OF UNDERLYING DOMAIN STRUCTURE?

DARWIN - EVOLUTION OF DOMAIN, EVOLUTION OF ONTOLOGY.

ANYONE EVER TALK ABOUT NATURAL SELECTION OF ONTOLOGIES?

w3.ibm.com/blog
IBM  SO I JUST SPENT THREE DAYS AT THE GOMPEX CONFERENCE LOOKING AT THE LATEST TECHNOLOGIES OUR PARTNERS, OUR CUSTOMERS, AND YES, OUR COMPETITORS ARE THINKING ABOUT. I'M EXHAUSTED SO DON'T HAVE TIME FOR AN EXTENDED TRIP REPORT YET - THAT WILL COME. BUT AN INITIAL REACTION, THE BROAD USAGE OF RFID TAGS FOR APPLICATIONS BEYOND THE TYPICAL HAS NOT HIT YET.
COMMENTS (0)

*FIG. 1*

METHOD FOR VISUAL DEPICTION OF AUDIENCES FOR VIEWING ITEMS IN BLOGS AND OTHER ELECTRONIC REPOSITORIES

TRADEMARKS

IBM® is a registered trademark of international Business Machines Corporation, Armonk, N.Y., U.S.A. Other names used herein may be registered trademarks, trademarks or product names of International Business Machines Corporation or other companies.

BACKGROUND

This invention relates visual depiction of audiencing and, more particularly, to visual depiction of audiences for viewing items in blogs, discussion forums, wikis, and other electronic repositories.

When people create an item on a blog or other similar electronic repository, they must decide on its audience. They must decide whether they should make the item available publicly to all, keep it internal to their company, group, team, or organization, or keep it private and viewable only by themselves.

Current tools support this option in one of two main ways: users can keep multiple blogs for different audiences or keep the items in a single location but with access control and audiencing set, to a greater or lesser extent, on the individual items. The main problem with the first approach is that people must maintain multiple repositories. They must decide when creating a new item where to place it and decide where to search when looking for an item they created in the past. If it makes sense for an item to be viewed by multiple audiences, they may be forced to duplicate efforts and place the item in several places/blogs. This problem of maintaining multiple similar blogs has caused people not to keep an internal company blog. The other approach, individual audiencing, can lead to potentially costly mistakes if people accidentally set audiencing incorrectly for items or lead to inefficiencies as they must switch among views to see the different items.

SUMMARY

According to an exemplary embodiment, a method is provided for visually depicting audiences for viewing items in one or more electronic repositories including a blog. Input from a user is received for creating different types of items for viewing in the blog. The different types of items include private items, items that are internal for an organization, and public items. Input is also received from the user for selecting audiences for viewing the different types of items in the blog. Items for viewing on the blog are selected from among the created items, and the selected items are displayed on the blog for viewing by the selected audiences. Each selected item is displayed with a visual cue that is distinct for each type of item. The visual cue indicates the selected audience for viewing the item.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

FIG. 1 illustrates an implementation of a unified tool for enabling users to identify an item in a blog or other electronic repository as private, internal to their company, team, or organization, or public, according to an exemplary embodiment.

Figure 2:
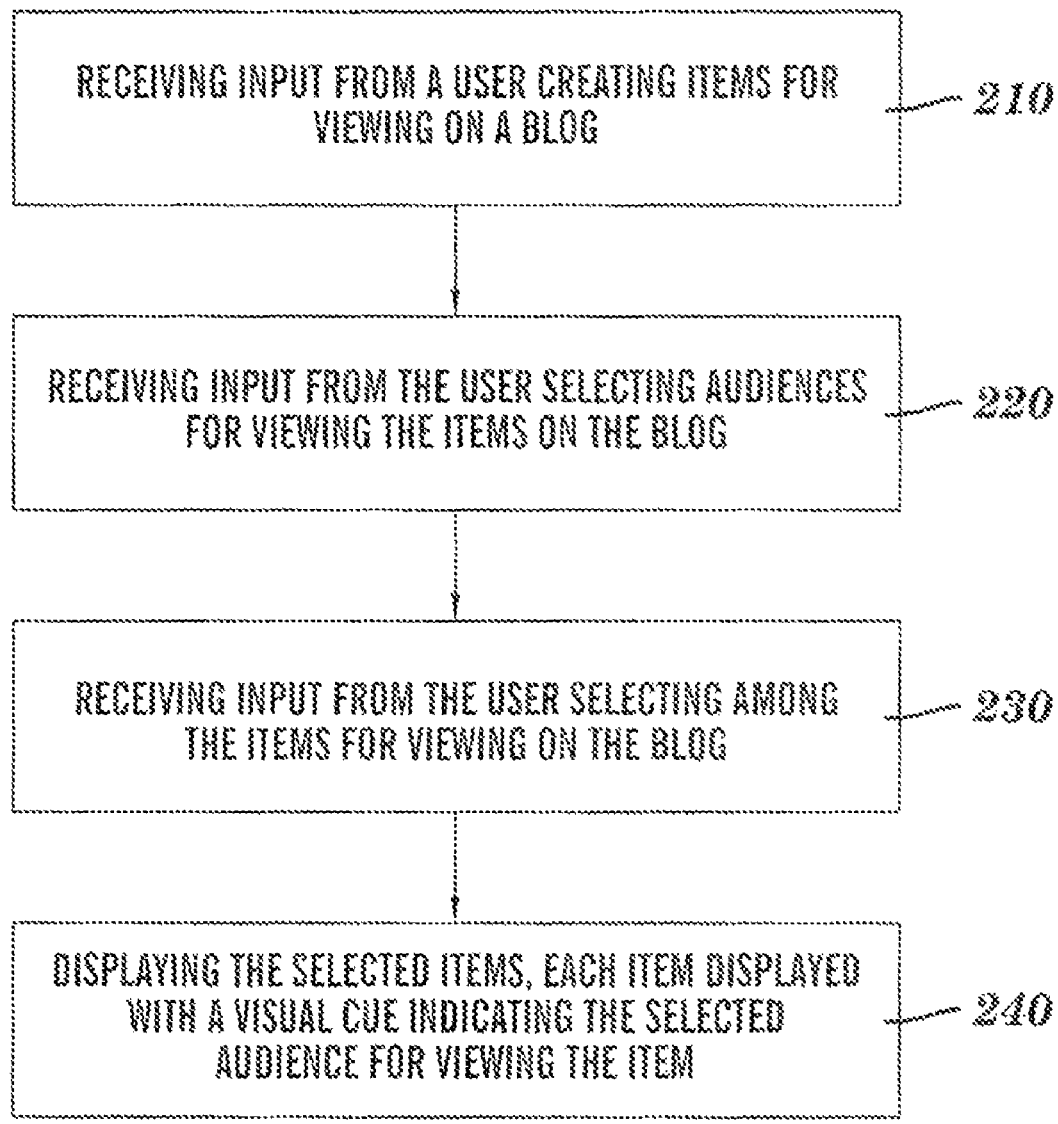
FIG. 2 illustrates a method for visual depiction of audiences for viewing items in blogs and other electronic repositories according to an exemplary embodiment.

The detailed description explains exemplary embodiments, together with advantages and features, by way of example with reference to the drawings.

DETAILED DESCRIPTION

According to an exemplary embodiment, a user interface and visual scheme allow users to work on a logically unified blog or similar tool that comprises personal, shared and public items and provides graphical cues to maximize understanding and minimize the cost of errors by surfacing the audience settings explicitly in a distinctive way. The tool also provides easy mechanisms for setting access control on the individual items. Other tools, including Lotus Notes and Activity Explorer, provide mechanisms for setting access control on individual items and even on components within items. According to an exemplary embodiment, however, a visual scheme is provided that makes these settings particularly salient and presents them in the context of a blog (or other electronic repository) to provide a more unified experience for a persons journaling activities.

FIG. 1 illustrates an implementation of a unified tool for enabling users to identify a posting in an electronic repository, such as a blog, as private, internal to their company, team, or organization, or public. Other electronic repositories in which the tool may be used include discussion, forums, wikis, etc. The tool makes it easy to set an access control list (ACL) and make the setting visually distinctive using graphical cues that are easy to see and that map analogically to the settings they represent. For example, a visual cue for a private personal item may involve depicting the item as a handwritten journal entry.

According to exemplary embodiments, there may be several ways for selecting and setting audiencing options and their visual depictions. For example, there may be default appearances for personal notes and public documents, and then either a system administrator or a user may add items. So, the user or a system administrator may define visual styles (font, indenting, background color and/or image, icon, etc.) and then map the visual styles to an audiencing (ACL) specification.

Referring to FIG. 1, a user interface screen 100 allows a user to select private, internal, and public items to view by "clicking" on view option buttons 110, 120, and 130, respectively. The view options buttons 110, 120, and 130 allow a user to choose which entries/items to see at any point in time (for example: all entries, just the public entries, or just those entries labeled as private). In FIG. 1, public information is depicted as item 140, internal information is depicted as items 150a and 150b, and private information is depicted as item 160. As can be seen from FIG. 1, each item is visually distinct and provides cues as to whether the item is private, internal, or public. For example, the private item 160 appears as a journal entry, the internal items 150a and 150b appear with an indication of the company for which they are internal (in this case IBM), and the item 140 appears with a globe to indicate it is a public item.

The tool makes it easy to set such access control through simple user interface action and make the setting visually distinctive to avoid the potential cost of getting the audiencing wrong. The tool enables the user to specify audiencing when an entry/item is first created. This may be done by "clicking on" buttons, such as "create a personal note", "add a public posting", etc. These buttons are not shown in FIG. 1 in the interest of simplifying the illustrations. Allowing the user to specify an audience for viewing an item when the item is created both increases efficiency and reduces the possibility for error in case the user forgets to specify the audience for viewing the item after the item is created. The user may change audiencing easily, e.g., change audiencing from private to public for any item.

To further reduce the possibility of error, an optional enhancement may be added, in which a brief delay is introduced between the time a user posts a new entry and the time it is made public. This allows the user an opportunity to notice the visual depiction of audiencing and correct it before information is revealed.

A goal, according to exemplary embodiment's, is to more effectively support multiple uses of blogs and other electronic repositories as both personal journals and publication mechanisms, and also to address issues around whether people should maintain an internal blog or one seen by a larger public audience. According to exemplary embodiments, this is accomplished by letting users experience the items as part of a single unified blog while preserving clear cues on the audience of each item.

This interface and visual depiction scheme described and illustrated herein may be used in other contexts as well. Also, while FIG. 1 depicts an example of a user interface for selecting and visually depicting audiencing of blog items, it should be appreciated that there may be many different ways to implement the interface.

FIG. 2 illustrates a method for visual depiction of audiences for viewing items in one or more electronic repositories, such as a blog, according to an exemplary embodiment. The method begins at step 210 at which input from a user for creating different types of items for viewing in the blog is received. The different types of items include, e.g., private items, items that are internal for an organization, and public items. At step 220, input is received from the user for selecting audiences for viewing the different types of items in the blog. Steps 210 and 220 may be performed at the same time, such that the audience for viewing a created item is selected when the item is created. Alternatively, the audience for viewing an item may be selected after the item is created. Also, the audience selected for viewing the item may be altered at any time. At step 230, input is received from the user for selecting among the items for viewing on the blog. At step 240, the selected items are displayed on the blog for viewing by the selected audiences. Each selected item is displayed with a visual cue that is distinct for each type of item. The visual cue indicates the selected audience for viewing the item.

The capabilities of the present invention can be implemented in software, firmware, hardware or some combination thereof.

For example, in one implementation, a user may interact with a central server using a web browser, so no specific code or modules need to be installed at the user's end. The central server may store the entries for posting in the blog or other electronic repository and control (and provide) access to each entry.

Another implementation may include an application that acts as an aggregator or the front end to other systems, where the choice of audiences drives the choice as to where a new item should be placed. This latter approach may be somewhat limited, in that switching audiencing (from public to private, for example) would require moving the item from one repository to another, and the external system would need to be relied upon to be sure the item is not still available for the public to view. This alternative does have the advantage that the external, existing systems can be relied upon to handle the content and can use the tool described herein a central point of access to multiple external repositories and their communities. This latter approach may be implemented using a computer program product that the user may install and run on his or her own computer or by using a central server accessed through a browser, with the central server serving as a gateway to the other systems.

One or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagram depicted herein is just an example. There may be many variations to these diagrams or the steps (or operations) described therein without departing from the spirit of the invention. For instance, the steps may be performed in a differing order, or steps may be added, deleted or modified. All of these variations are considered a part of the claimed invention.

While exemplary embodiments have been described, it will be understood that those skilled in the art, both now and in the future, may make various improvements and enhancements which fall within the scope of the claims which follow. These claims should be construed to maintain the proper protection for the invention first described.

What is claimed is:

1. A method for visually depicting audiences for viewing items in one or more electronic repositories including a blog, comprising:
   receiving input from a user for creating different types of items for viewing in the blog, wherein the different types of items include private items, items that are internal for an organization, and public items;
   receiving input from the user for selecting audiences for viewing the different types of items in the blog;
   receiving input from the user for selecting among the items for viewing on the blog; and
   displaying the selected items on the blog for viewing by the selected audiences, wherein each selected item is displayed with a visual cue that is distinct for each type of item, the visual cue indicating the selected audience for viewing the item, wherein the displaying comprises displaying a user interface screen including:
   a public view option button associated with a corresponding public display of only the public items,
   an internal view option button associated with a corresponding organizationally internal display of the public items and the items that are internal for the organization, and
   a private view option button associated with a corresponding private display of the public items, the items that are internal for the organization and the private items.

2. The method of claim 1, wherein the audiences for viewing the different types of items are selected upon creation of the different types of items.

3. The method of claim 1, further comprising receiving input from the user altering selected audiences for viewing items in the blog.

4. The method of claim 1, wherein there is a delay between the time a user creates an item and selects an audience for viewing the item to allow the user an opportunity to change the audience for viewing the item.

* * * * *